United States Patent [19]
Röhm

[11] Patent Number: 5,171,030
[45] Date of Patent: Dec. 15, 1992

[54] SELF-TIGHTENING DRILL CHUCK

[76] Inventor: Günter Röhm, Heinrich-Röhm-Strasse 50, D-7927 Sontheim, Fed. Rep. of Germany

[21] Appl. No.: 337,385

[22] Filed: Apr. 13, 1989

[30] Foreign Application Priority Data

Nov. 23, 1988 [DE] Fed. Rep. of Germany ....... 3839429

[51] Int. Cl.⁵ ............................................. B23B 31/12
[52] U.S. Cl. ...................................... 279/63; 279/902; 279/62; 279/194
[58] Field of Search ...................... 279/60–64, 279/1 B, 1 K, 19, 19.4, 19.5, 1 ME, 19.1, 19.2, 19.3, 19.6; 173/47, 48

[56] References Cited

U.S. PATENT DOCUMENTS

| 3,325,166 | 6/1067 | McCarthy et al. | 279/1 ME |
| 4,619,461 | 10/1986 | Rohm | 173/48 X |
| 4,645,387 | 2/1987 | Röhm | 408/127 |

FOREIGN PATENT DOCUMENTS 605717 11/1934 Fed. Rep. of Germany ........ 279/63
3808155 9/1989 Fed. Rep. of Germany .

Primary Examiner—Larry I. Schwartz
Assistant Examiner—Lloyd Schultz
Attorney, Agent, or Firm—Herbert Dubno; Andrew Wilford

[57] ABSTRACT

A self-tightening drill chuck adapted to be mounted on a drill spindle for rotation about and reciprocation along the axis of the spindle has a guide body rotatable on the spindle about the axis and formed with a plurality of jaw guides inclined relative to the axis and spaced angularly thereabout and formations axially fixing the guide body on the spindle against substantial relative axial displacement. Respective jaws displaceable in the guides are formed with radially directed teeth meshing with a screwthread of an adjustment body fixed on the spindle against rotation thereon so that rotation of the adjustment body relative to the guide body in one direction displaces the jaws radially toward one another and opposite rotation displaces the jaws radially apart. Further formations secure the adjustment body on the spindle for limited relative axial displacement substantially greater than the relative axial displacement possible between the guide body and the spindle.

10 Claims, 3 Drawing Sheets

SELF-TIGHTENING DRILL CHUCK

FIELD OF THE INVENTION

The present invention relates to self-tightening drill chuck. More particularly this invention concerns such a chuck that is used on a hammer drill.

BACKGROUND OF THE INVENTION

A standard drill chuck has a guide body that may form the core of the chuck or that may be formed as a tightening sleeve and that is itself formed with guides inclined to the chuck axis. Respective jaws are axially slidable in these guides and have teeth that mesh with a screwthread of an adjustment body that itself may either be the core of the chuck or a sleeve. Both these bodies are axially fixed on the drill spindle. The guide body is typically rotationally fixed on the drill spindle while the adjustment body is rotatable thereon so that relative rotation of these two bodies in one direction moves the jaws axially forward and radially inward toward one another and opposite relative rotation moves them axially back and radially apart. Thus it is possible by rotation of this adjustment body to clamp a tool (or workpiece) in the jaws and by opposite rotation to release this tool (or workpiece).

German patent document 3,727,147 whose U.S. equivalent is U.S. Pat. No. 3,836,563 describes a system wherein the threaded adjustment body is the core of the chuck and has a frustoconical surface formed with the screwthread that serves to displace the jaws. The guide body is a sleeve surrounding the adjustment body and rotationally fixed on the spindle. A locking ring is provided on the chuck and has teeth urged by a spring into axial engagement with teeth of the adjustment body to prevent it from loosening or from tightening excessively, as the screwthread is of such a hand that the torque exerted via the jaws on the chuck parts tightens the chuck. This locking ring is movable between a pair of end positions defined by a pin set in a recess of the adjustment sleeve.

In German patent document 3,808,155 another arrangement is known wherein the guide body is surrounded by an adjustment sleeve having an internal screwthread and itself rotationally and axially fixed on the drill spindle. This arrangement also has a locking ring between the guide body and the adjustment sleeve for limiting tightening action.

Both systems use a one-piece drill spindle that cannot move axially or rotationally relative to the screwthreads. Thus this threaded body serves to transmit axial force, the hammering, to the jaws via the screwthread on this body and the teeth on the jaws. The result is an extremely effective self-tightening action that in fact can lead to the chuck getting so tight that it becomes very difficult or even impossible to loosen it and free the tool (or workpiece).

OBJECTS OF THE INVENTION

It is therefore an object of the present invention to provide an improved hammer-drill chuck.

Another object is the provision of such an improved hammer-drill chuck which overcomes the above-given disadvantages, that is which does not lead to the above-mentioned overtightening.

SUMMARY OF THE INVENTION

A self-tightening drill chuck adapted to be mounted on a drill spindle for rotation about and reciprocation along the axis of the spindle according to this invention has a guide body rotatable on the spindle about the axis and formed with a plurality of jaw guides inclined relative to the axis and spaced angularly thereabout and formations axially fixing the guide body on the spindle against substantial relative axial displacement. Respective jaws displaceable in the guides are formed with radially directed teeth meshing with a screwthread of an adjustment body fixed on the spindle against rotation thereon so that rotation of the adjustment body relative to the guide body in one direction displaces the jaws radially toward one another and opposite rotation displaces the jaws radially apart. Further formations secure the adjustment body on the spindle for limited relative axial displacement substantially greater than the relative axial displacement possible between the guide body and the spindle.

Thus the adjustment body is more axially displaceable relative to the spindle than the guide body. As a result the axial forces will be transmitted along a path through the guide body, not through the adjustment body, to the jaws of the chuck. This will substantially eliminate the overtightening problem while not eliminating the self-tightening effect completely. The teeth will be spared the substantial load they are subjected to in prior-art systems so that the chuck of this invention will have a substantially improved service life.

According to another feature of this invention the formations fixing the guide body on the spindle include a pair of axially abutting surfaces one of which is on the guide body and the other of which is on the spindle. In fact the guide body is wholly axially nondisplaceable on the spindle.

In accordance with a further feature of the invention the spindle includes a spindle sleeve forming the respective surface and carrying the adjustment body. In addition the formations include an element rotatably supporting the guide body on the adjustment body and axially spaced from the abutting surfaces. In this case the adjustment body is within the guide body.

The formations fixing the guide body on the spindle include a nonaxial pin engaged between the guide body and the spindle and an axially elongated notch through which the pin engages tangentially and in which the pin is engaged with axial but not radial or angular play. This arrangement ensures that the rotational coupling will be very strong while the axial decoupling remains effective. In addition the ends of the pin can serve as end stops for a standard locking ring.

It is also possible according to the invention for the guide body to be within the adjustment body. In this case the adjustment member is an internally threaded sleeve surrounding the guide body. Furthermore in this arrangement the spindle includes a spindle tube surrounding a hammer rod and the formations securing the adjustment body on the spindle are engaged with the spindle tube, not with the hammer rod.

DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
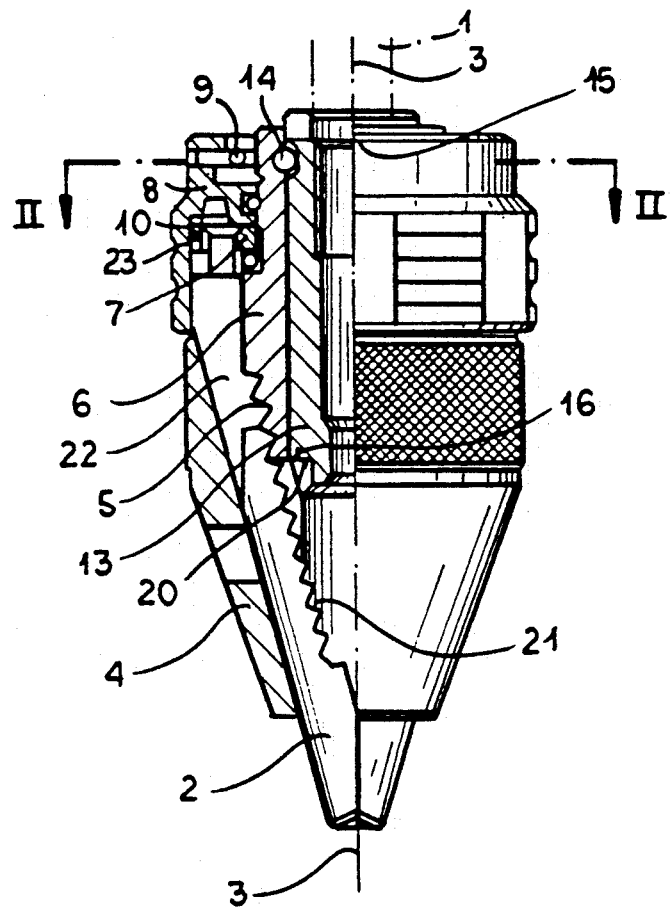
FIG. 1 is an axial section through a drill chuck according to this invention.
Figure 2:
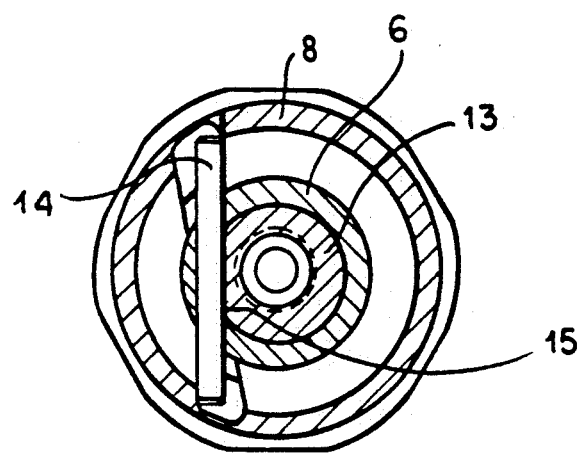
FIG. 2 is a section taken along line II—II of FIG. 1.

As seen in FIGS. 1 and 2 a chuck according to this invention is carried on a drill spindle 1 centered on, rotatable about, and limitedly axially reciprocal along an axis 3. Fixed directly on the end of this spindle 1 is a core body or sleeve 13 forming an axially forwardly directed annular shoulder 20 lying in a plane perpendicular to this axis 3. Carried in turn on this sleeve 13 is an adjustment body or sleeve 6 formed centered on the axis 3 with a frustoconical screw thread 5. Rotatable on the adjustment sleeve 6 is a guide body or sleeve 4 formed centered on the axis 3 with three identical and angularly equispaced guide slots 22 inclined at an acute angle to the axis 3. In addition the sleeve 4 has an axially backwardly directed abutment surface 16 bearing flatly on the surface 20 and an element 7 is provided to axially couple the bodies 4 and 6 together. Each slot 22 receives a respective jaw 2 having an inner edge formed with teeth 21 complementary to and meshing with the screwthread 5.

The chuck is provided with a locking ring 8 that is limitedly angularly displaceable and axially displaceable against the force of a spring 9. When pushed forward by the spring 9 teeth 10 on the ring 8 engage complementary teeth 23 on the sleeve 4, so that in this interengaged position rotation of the sleeve 4 is limited by the ring 8.

According to this invention the adjustment sleeve 6 is rotationally fixed on the sleeve 13 by a tangential pin 14 that is fixed in the sleeve 6 but that engages in an outwardly open tangential notch 15 formed in the sleeve 13. This notch 15 is axially extended so that the pin 14 and sleeve 6 can move axially somewhat relative to the spindle 1, unlike the sleeve 4 that is unable to make such axial movement relative to the spindle 1. The ends of this pin 14 serve as indicated in FIG. 2 to limit the angular movement of the ring 8 and therefore define this ring's end positions.

As a result of this construction the axial reciprocation or hammering in the spindle 1 is transmitted to the jaws 2 primarily through the guide body 4. The limited ability of the adjustment body 6 to move limitedly angularly relative to this guide body 4 will avoid force transmission from the adjustment body 6 to the jaws 2, thereby avoiding the overtightening that plagued the prior-art systems.

Figure 3:
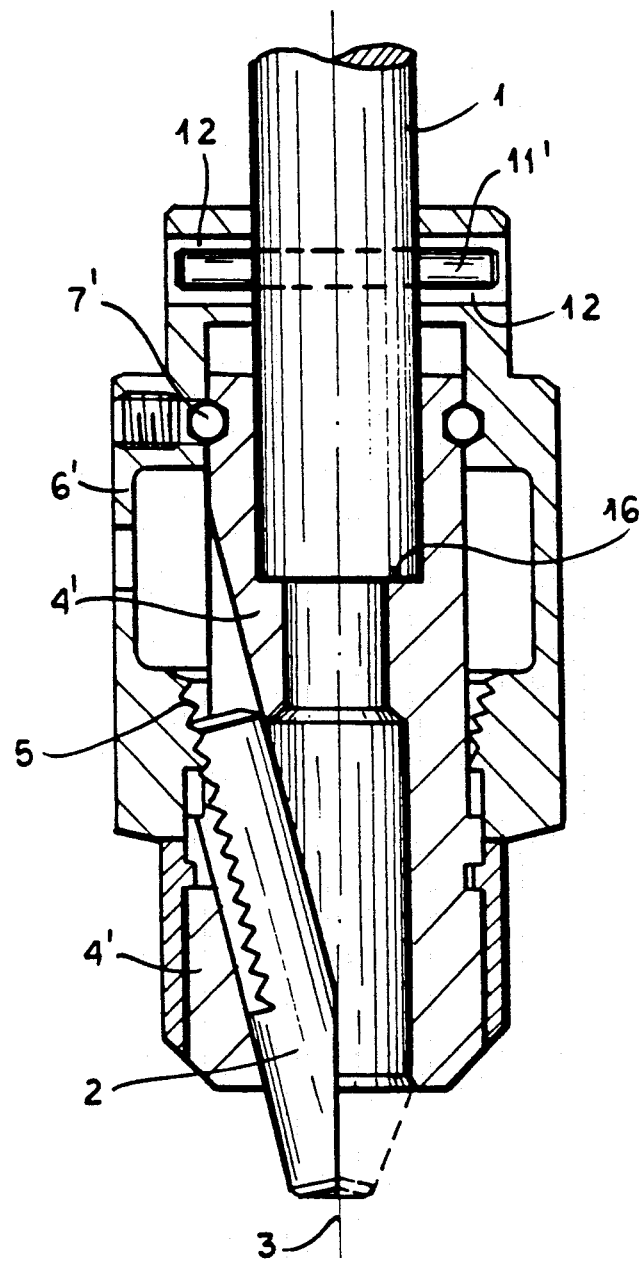
FIGS. 3 and 4 are axial sections through two further chucks according to this invention.

In FIG. 3 a system is shown having a guide body 4' that cannot move axially on the spindle 1 but that can rotate thereon. Balls 7' constitute formations axially but not rotationally coupling this body 4' with an adjustment sleeve 6' that is limitedly axially displaceable but rotatably nondisplaceable on the spindle 1. This coupling is here effected by a pin 11' extending diametrally through and fixed in the spindle 1 and having ends received in slots 12 formed in the body 6'. These slots 12 have a width measured perpendicular to the axis 3 that is substantially the same as the diameter of the pin 11, but are axially elongated.

Figure 4:
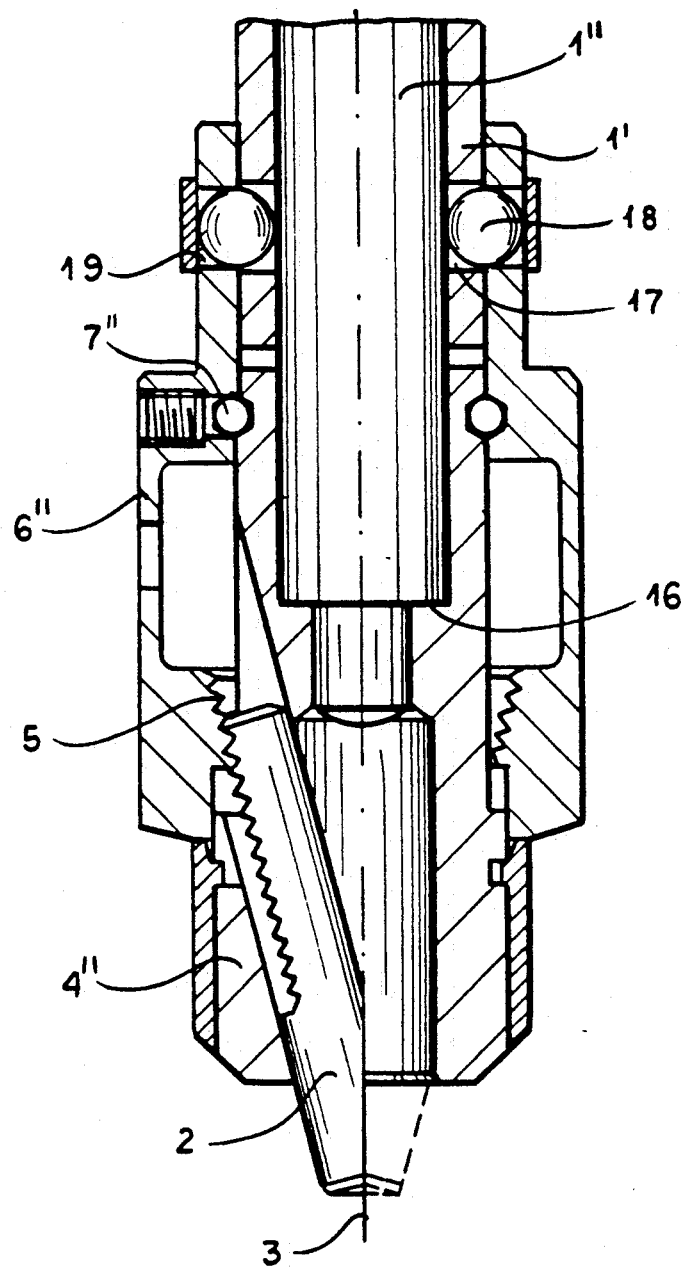

The arrangement of FIG. 4 has a spindle with an outer rotating sleeve 1' and an inner axially reciprocating hammer rod 1". The sleeve is coupled by balls 18 to an outer adjustment sleeve 6" like the sleeve 6'. These balls 18 fit in axially elongated slots 17 like the holes 12 but here formed in the rotating spindle tube 1'. The hammer rod 1" beats on the abutment face 16 of the guide body 4".

I claim:

1. A self-tightening drill chuck adapted to be mounted on a drill spindle for rotation about and reciprocation along the axis of the spindle, the chuck comprising:
   a guide body rotatable on the spindle about the axis and formed with a plurality of jaw guides inclined relative to the axis and spaced angularly thereabout;
   means including a formation on the guide body and a formation on the spindle engaging the guide-body formation for fixing the guide body on the spindle against axial displacement on the spindle and for transferring axial displacement of the spindle directly to the guide body;
   respective jaws displaceable in the guides and formed with radially directed teeth;
   an adjustment body fixed on the spindle against rotation thereon and formed with a screwthread meshing with the teeth of the jaws, rotation of the adjustment body relative to the guide body in one direction displacing the jaws radially toward one another and opposite rotation displacing the jaws radially apart; and
   means including interengaging formations on the adjustment body and spindle securing the adjustment body on the spindle for limited relative axial displacement thereon.

2. The self-tightening drill chuck defined in claim 1 wherein the formations fixing the guide body on the spindle include a pair of axially abutting surfaces one of which is on the guide body and the other of which is on the spindle.

3. The self-tightening drill chuck defined in claim 2 wherein the spindle includes a spindle sleeve forming the respective surface and carrying the adjustment body.

4. The self-tightening drill chuck defined in claim 2 wherein the formations securing the adjustment body on the spindle include an element rotatably supporting the guide body on the adjustment body, the element being axially spaced from the abutting surfaces.

5. The self-tightening drill chuck defined in claim 1 wherein the adjustment body is within the guide body.

6. The self-tightening drill chuck defined in claim 1 wherein the formations fixing the guide body on the spindle include a nonaxial pin engaged between the guide body and the spindle.

7. The self-tightening drill chuck defined in claim 6 wherein the formations fixing the guide body on the spindle include an axially elongated notch through which the pin engages tangentially and in which the pin is engaged with axial but not radial or angular play.

8. The self-tightening drill chuck defined in claim 6, further comprising a locking ring on the bodies angularly displaceable between end positions defined by ends of the pin.

9. The self-tightening drill chuck defined in claim 1 wherein the guide body is within the adjustment body.

10. The self-tightening drill chuck defined in claim 9 wherein the spindle includes a spindle tube surrounding a hammer rod, the formations securing the adjustment body on the spindle being engaged with the spindle tube, not with the hammer rod.

* * * * *